United States Patent
Coughlan et al.

(10) Patent No.: US 7,764,782 B1
(45) Date of Patent: Jul. 27, 2010

(54) METHOD AND APPARATUS FOR ROUTING TELECOMMUNICATION CALLS

(75) Inventors: Marc William Joseph Coughlan, Rozelle (AU); Alexander Quentin Forbes, Westleigh (AU); Julian James Orbach, Macquarie Park (AU); Peter Donald Runcie, Bigola Plateau (AU); Alexander Martin Scholte, Phegans Bay (AU); Ralph Warta, Lane Cove (AU)

(73) Assignee: Avaya Inc., Basking Ridge, NJ (US)

( * ) Notice: Subject to any disclaimer, the term of this patent is extended or adjusted under 35 U.S.C. 154(b) by 1346 days.

(21) Appl. No.: 11/094,457

(22) Filed: Mar. 30, 2005

Related U.S. Application Data (63) Continuation-in-part of application No. 10/810,459, filed on Mar. 27, 2004.

(51) Int. Cl.
 H04M 3/00 (2006.01)
 G01S 15/00 (2006.01)
 H04W 68/00 (2009.01)

(52) U.S. Cl. .................. 379/373.01; 379/201.01; 367/93; 367/95; 455/458; 455/418

(58) Field of Classification Search .............. 379/201, 379/207, 209, 373.01–373.03; 367/93, 95; 455/458, 418
See application file for complete search history.

(56) References Cited

U.S. PATENT DOCUMENTS

| | | | |
|---|---|---|---|
| 4,932,050 A | 6/1990 | Davidson et al. | |
| 5,208,864 A | 5/1993 | Kaneda | |
| 5,680,450 A | 10/1997 | Dent et al. | |
| 5,712,911 A * | 1/1998 | Her | 379/388.01 |
| 5,828,626 A | 10/1998 | Castile et al. | |
| 6,026,152 A * | 2/2000 | Cannon et al. | 379/142.06 |
| 6,154,525 A | 11/2000 | Formosa | |
| 6,408,187 B1 * | 6/2002 | Merriam | 455/458 |
| 6,542,436 B1 * | 4/2003 | Myllyla | 367/95 |
| 6,546,096 B1 * | 4/2003 | Meiden et al. | 379/209.01 |
| 6,954,657 B2 * | 10/2005 | Bork et al. | 455/567 |
| 7,120,238 B1 * | 10/2006 | Bednarz et al. | 379/201.1 |
| 7,302,280 B2 * | 11/2007 | Hinckley et al. | 455/567 |
| 2002/0132647 A1 | 9/2002 | Chia et al. | |
| 2003/0185402 A1 | 10/2003 | Benesty et al. | |
| 2004/0022394 A1 | 2/2004 | Michaelis | |
| 2004/0259536 A1 * | 12/2004 | Keskar et al. | 455/418 |
| 2006/0189357 A1 * | 8/2006 | Hsueh | 455/567 |

* cited by examiner

*Primary Examiner*—Curtiz Kuntz
*Assistant Examiner*—Mohammad K Islam
(74) *Attorney, Agent, or Firm*—John C. Moran (57) ABSTRACT

A method and apparatus route telecommunication calls depending on a detected approach of a user towards a telecommunication device.

14 Claims, 7 Drawing Sheets

METHOD AND APPARATUS FOR ROUTING TELECOMMUNICATION CALLS

CROSS REFERENCE TO RELATED APPLICATIONS

This patent application is a Continuation In Part of U.S. patent application Ser. No. 10/810,459, filed on Mar. 27, 2004, and assigned to the same assignee as the present application. U.S. patent application Ser. No. 10/810,459 is hereby incorporated by reference.

TECHNICAL FIELD

The present invention relates to communication systems and, in particular, to the routing of telephone calls and other telecommunication media.

BACKGROUND

Within the prior art, a well known problem in receiving telecommunication calls is when a call is ringing and a person is unable to reach the telephone before the call is transferred to a voice messaging system or an answering machine. The problem is often the called person is just about to answer the call when the call is transferred to a voice messaging system or an answering machine. This is not only frustrating for the callee but also the caller.

SUMMARY

The foregoing problems are solved by a method and apparatus for routing telecommunication calls depending on a detected approach of a user towards a telecommunication device.

DETAILED DESCRIPTION

An embodiment determines if a user is approaching a telecommunication terminal during alerting of the telecommunication terminal and extends the alerting time so that the user may answer an incoming call. In another embodiment, the detected approach results in the user being notified that the approach has been detected. In yet another embodiment, the fact that the approach was detected during alerting is recorded.

In one embodiment, the telecommunication terminal is equipped with speaker phone capability, a separate microphone, or other audio transducers. The ringing of the telecommunication terminal is utilized to determine the echoes that are being returned to the telecommunication terminal via the microphone of the telecommunication terminal that is normally utilized for the speaker phone functions. The telecommunication terminal utilizes the fact that the telephone is not being answered to determine what the probability is that the user is presently approaching the telecommunication terminal. If it is determined that a user is approaching the telecommunication terminal, ringing will continue to give the user a chance to answer the call. Over a period of time, the telecommunication terminal determines the echoes that indicate presence or non-presence of the user based on whether incoming calls are answered by the user. A sufficient period of time is required to allow for the user simply not answering some calls to train the telecommunication terminal.

In another embodiment, the user trains the telecommunication terminal to detect and to know the difference between echoes when the user is present to the telecommunication terminal and when the user is not in the presence of the telecommunication terminal. The user would conduct a fixed training session during which the telecommunication terminal would ring both when the user is present and when the user is not present. Since during this training session, the telecommunication terminal knows when the user is present or not, it catalogs the echoes based on this knowledge and uses this knowledge for later telecommunication calls to determine when the user is approaching a ringing telecommunication terminal.

The echo characteristics are determined by the acoustical path between the speaker (device producing the audio signal) and the microphone (device receiving the audio signal). The acoustical path is normally rather complex for an enclosed room or cubicle with different acoustical paths having more or greater delay in the return signal. In addition, the individual acoustical paths with attenuate the original signal in varying amounts. It is the determination of the difference in the acoustical path between when the user of the telecommunication terminal is present and when the user is not present. Furthermore, additional people in the room will also modify the acoustical paths. Indeed this is information that can be utilized to further determine whether a call should be rung at the telecommunication terminal.

In another embodiment, the telecommunication terminal includes an ultrasonic or subsonic transducer that transmits either continuously or in short intervals or transmits just prior to ringing the telecommunication terminal for an incoming call. The return echo from the ultrasonic or subsonic transducer is utilized to detect the presence of the user. The sonic transducer broadcasts pulses in a broad area, and it is the echo or lack of echoing of the sonic pulses that is utilized to detect the presence of the user. Again, the telecommunication terminal utilizing the sonic transducer may be trained by the user or utilized self-training on the basis of whether the user has answered a telephone call or not to perform the echo analysis. The advantage of embodiments utilizing a sub or ultrasonic transducer is that the testing to determine if the user is present can be done on a relatively continuous basis without annoying the user.

In another embodiment, the telecommunication terminal is equipped with an infrared sensor that detects the heat from the user's body to determine the presence of the user. The infrared transducer would be tuned for the emissions that arrive from the spectrum normally given off by a human body. This would assist in masking other heat sources. Note, that the infrared sensor is simply determining a difference in the amount of infrared emissions being received to determine the presence of the user and not trying to fix the exact position in the location of the telecommunication terminal.

In another embodiment, short range high frequency radio signals are utilized to detect the presence of the user. The detection is done by the reflection or absorption of the high frequency radio signals by the user. Again, it is not necessary to determine the exact position of the user within the location of the telecommunication terminal but only to determine that the user is within this location.

In another embodiment, a camera is used to detect the presence of the user using visual techniques.

Figure 1:
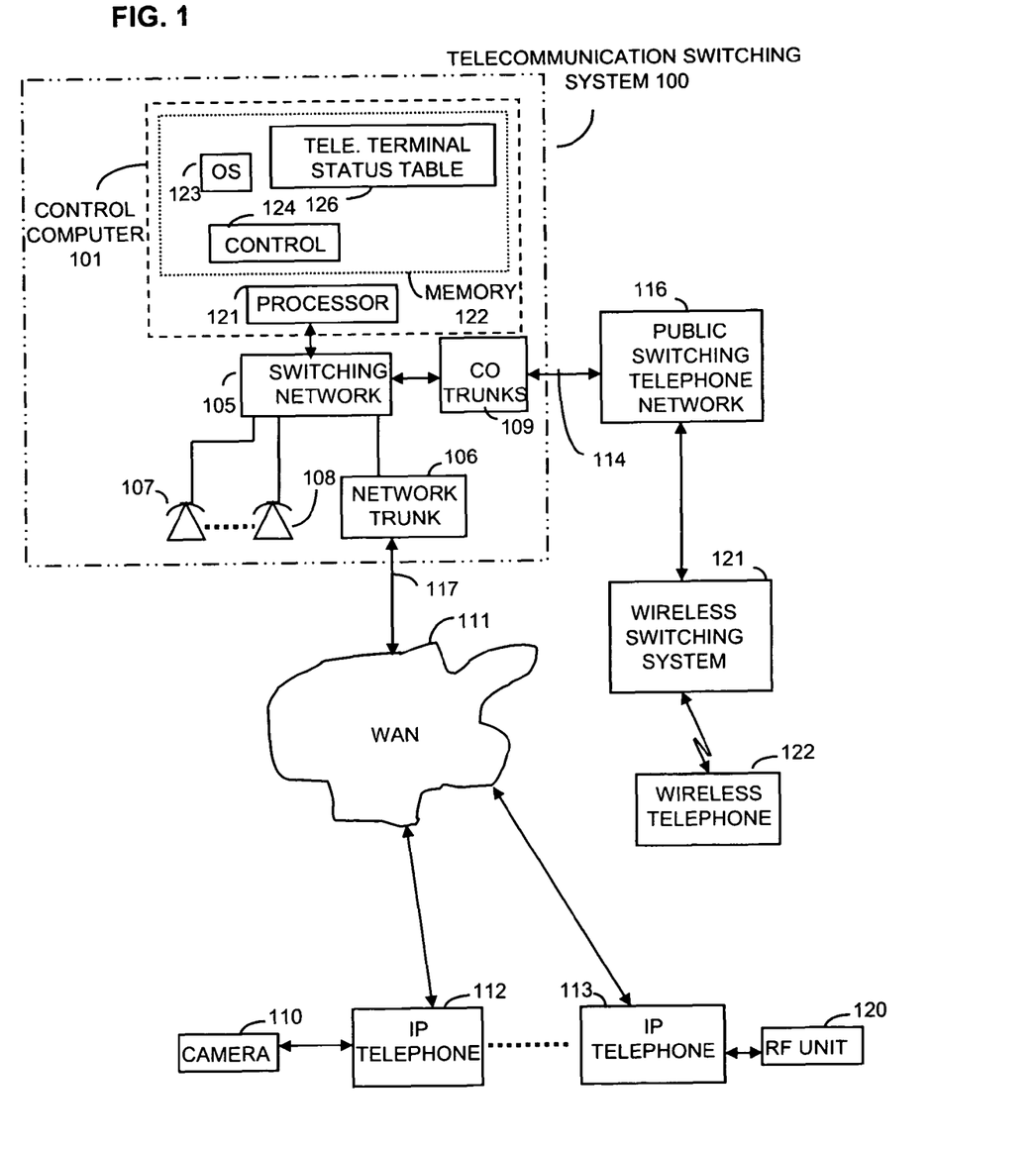
FIG. 1 illustrates, in block diagram form, an embodiment.

FIG. 1 illustrates a system for utilizing and implementing embodiments. The detection of whether a user is close to their telecommunication terminal can be implemented on a digital telephone such as digital telephone 108 that is implementing either a proprietary digital protocol or an ISDN protocol. In addition, the embodiments can be implemented by an IP telephone such as IP telephone 112. IP telephone 112 can be a conventional IP telephone set or can be IP telephone functions being implemented by a computer such as a personal computer. In addition, IP telephone 112 receives video or still picture input from camera 110. This input may be used to detect the presence of the user using techniques well known to those skilled in the art. Also, IP telephone 113 receives RF input from RF unit 120. This input may be used to detect the presence of the user using RF techniques well known to those skilled in the art. Such RF techniques include but are not limited to radar. The IP telephones are interconnected to the telecommunication switching system 100 via wide area network (WAN) 111 which is connected to network trunk 106. Within telecommunication system 100, the switching functions are performed by switching network 105. CO trunks 109 interconnects telecommunication switching system 100 to public switching telephone network 116.

Further, the detection of whether a user is close to their telecommunication terminal can be implemented on a wireless telephone such as wireless telephone 122. Wireless telephone 122 is interconnected to telecommunication switching system 100 via public switching telephone network 116 and wireless switching system 121. The embodiments for performing detection can be implemented on either telecommunication switching system 100 or wireless switching system 121. Wireless telephone 122 may be equipped with visual, RF, ultrasonic, or acoustical units to perform the detection operations.

Control computer 101 controls the operations of telecommunication switching system 100. This control is performed by processor 121 executing programs and data out of memory 122. Overall control is performed by operating system 123 with the telecommunication functions being controlled by control 124. Processor 121 stores a variety of data in memory 122; however, only the telecommunication terminal status table 126 is illustrated. In one embodiment, it is telecommunication terminal status table 126 that is updated by processor 121 by execution of control 124 when a message is received from a telecommunication terminal during alerting indicating that a user is approaching the vicinity of the telecommunication terminal. In response to this message, control 124 utilizes the information stored in telecommunication terminal status table 126 to perform specified operations, such to continue to alert the terminal for a predefined period of time which is longer than a normal predefined period of time before a call is transferred to a messaging system. Other operations performed by control 124 could also be influenced by the approach of the user of a telecommunication terminal as would be readily envisioned by those skilled in the art. One skilled in the art would immediately realize that other types of telecommunication switching systems could be used.

Figure 2:
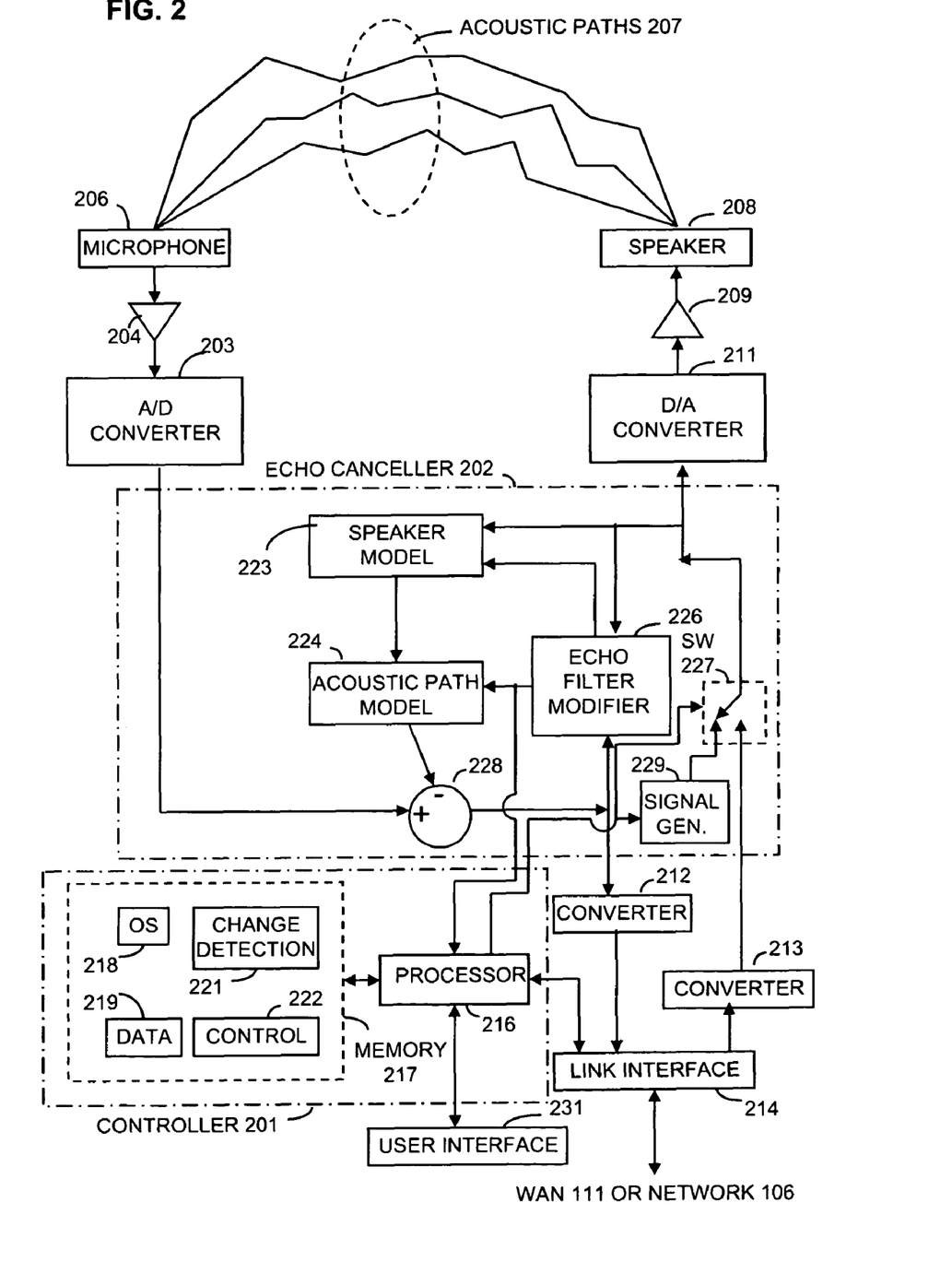
FIG. 2 illustrates, in block diagram form, an embodiment of a telecommunication terminal.

FIG. 2 illustrates, in block diagram form, a telecommunication terminal such as telecommunication terminal 108 or IP telephone 112 of FIG. 1. Controller 201 performs overall control of the telecommunication terminal. User interface 231 consists of a handset, buttons, indicators, displays, etc. that are normally found on a telecommunication terminal. Controller 201 receives and transmits telecommunication control and status information to a telephone switching system via link interface 214. Converters 212 and 213 are utilized to convert information received from link interface 214 and transmitted to link interface 214. This conversion may require a digital-to-analog or analog-to-digital type conversion or may require the conversion of audio information encoded in one digital protocol to another digital protocol.

Echo canceller 202 performs the functions of reducing the echoes caused by acoustic paths 207 by adjusting speaker and acoustic path models. In addition, echo canceller 202 provides to controller 201 the changes in acoustic path 207.

D/A converter 211 and amplifier 209 receive encoded digital information from converter 213 or signal generator 229 and transform this information into audio information that speaker 208 produces as audio signals. This audio information can be within the human hearing range or above or below the human hearing range. Microphone 206 is responsive to the echoes generated by acoustic paths 207 and any human speech or ambient audio information present to transmit this information to amplifier 204. In turn, A/D converter 203 converts it to digital information.

Controller 201 consists of processor 216 which provides control by executing programs stored in memory 217. Operating system 218 supplies the overall control. Processor 216 stores information in data 219. Change detection 221 is utilized to determine if a change indicating the absence or presence of a user has been received from echo canceller 202. Control routine 222 performs the overall control functions of the telecommunication terminal. The operations of echo canceller 202 with the exception of signal generator 229 and switch 227 are described in greater detail in U.S. Pat. No. 5,680,450 which is hereby incorporated by reference. In addition to signal generator 229 and switch 227, the output of echo filter modifier 226 to acoustic path model 224 is also transmitted to controller 201. In the above incorporated U.S. patent, speaker model 223 and acoustic path model 224 are illustrated and discussed as each having two separate subunits. That has not been shown in FIG. 2 simply to reduce the detail within the figure. However, one skilled in the art would readily realize that speaker model 223 and acoustic path model 224 indeed can be made up of two or more sub units. Acoustic path model 224 models the acoustic path 207. Acoustic path model 224 is iteratively developed using the input received from echo filter modifier 226. Echo filter modifier 226 performs this operation in response to the digital audio output signal from converter 213 or signal generator 229 and the output of subtractor 228 utilizing operations described in detail in the above incorporated U.S. patent. Subtractor 228 is responsive to the information received from ND converter 203 which represents the audio information received by microphone 206 in digital form and the output of acoustic path model 224. Speaker model 223 models the output of speaker 208 in digital form and transmits this digital information to acoustic path model 224. Speaker model 223, acoustic path model 224, subtractor 228, echo filter modifier 226, switch 227 and signal generator 229 can be implemented using separate digital signal processors or may be implemented on one DSP. In addition, echo canceller 202 may also be implemented by processor 216.

Switch 227 and signal generator 229 are controlled by processor 216. Switch 227 either selects the output of signal generator 229 or converter 213 and transmits the selected information to D/A converter 211, speaker model 223, and echo filter modifier 226.

Signal generator 229 is used by processor 216 to generate a ringing signal in response to an incoming call and to also generate other audio tones commonly utilized by a telecommunication terminal. In addition, signal generator 229 is utilized to generate the audio tones to be used to evaluate the acoustic paths 207 when the user is absent or present from the telecommunication terminal. These test tones may be within the human hearing range or above or below the human hearing range.

Figure 3:
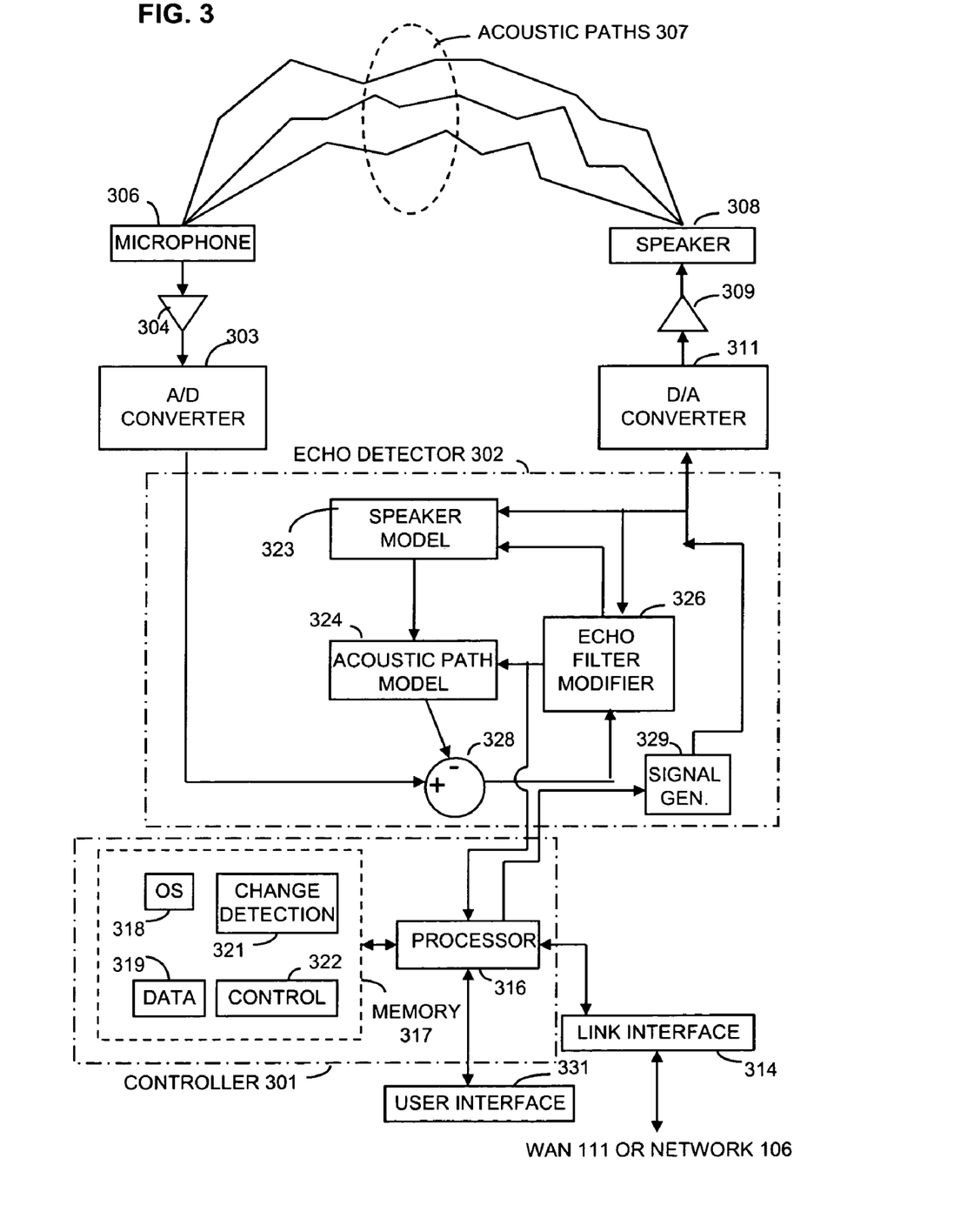
FIG. 3 illustrates, in block diagram form, another embodiment of a telecommunication terminal.

FIG. 3 illustrates, in block diagram form, a telecommunication terminal such as telecommunication terminal 108 or IP telephone 112 of FIG. 1. Controller 301 performs overall control of the telecommunication terminal. User interface 331 consists of a handset, buttons, indicators, displays, etc. that are normally found on a telecommunication terminal. Controller 301 receives and transmits telecommunication control and status and audio information to a telephone switching system via link interface 314.

Echo detector 302 performs the functions of reducing the echoes caused by acoustic paths 307 by adjusting speaker and acoustic path models. In addition, echo detector 302 provides to controller 301 the changes in acoustic path 307.

D/A converter 311 and amplifier 309 receive encoded digital information from signal generator 329 and transform this information into audio information that speaker 308 produces as audio signals. This audio information can be within the human hearing range or above or below the human hearing range. Microphone 306 is responsive to the echoes generated by acoustic paths 307 and any human speech or ambient audio information present to transmit this information to amplifier 304. In turn, ND converter 303 converts it to digital information.

Controller 301 consists of processor 316 which provides control by executing programs stored in memory 317. Operating system 318 supplies the overall control. Processor 316 stores information in data 319. Change detection 321 is utilized to determine if a change indicating the absence or presence of a user has been received from echo detector 302. Control routine 322 performs the overall control and audio processing functions of the telecommunication terminal. In general, the operations of echo detector 302 are described in U.S. Pat. No. 5,680,450 which is hereby incorporated by reference. Acoustic path model 324 models the acoustic path 307. Acoustic path model 324 is iteratively developed using the input received from echo filter modifier 326. Echo filter modifier 326 performs this operation in response to the digital audio output signal of signal generator 329 and the output of subtractor 328 utilizing operations described in detail in the above incorporated U.S. patent. Subtractor 328 is responsive to the information received from A/D converter 303 which represents the audio information received by microphone 306 in digital form and the output of acoustic path model 324. Speaker model 323 models the output of speaker 308 in digital form and transmits this digital information to acoustic path model 324. Speaker model 323, acoustic path model 324, subtractor 328, echo filter modifier 326, and signal generator 329 can be implemented using separate digital signal processors or may be implemented on one DSP. In addition, echo detector 302 may also be implemented by processor 316.

Signal generator 329 are controlled by processor 316. Signal generator 329 transmits its output to D/A converter 311, speaker model 323, and echo filter modifier 326. Signal generator 329 is used by processor 316 to generate a ringing signal in response to an incoming call and to also generate other audio tones commonly utilized by a telecommunication terminal. In addition, signal generator 329 is utilized to generate the audio tones to be used to evaluate the acoustic paths 307 when the user is absent or present from the telecommunication terminal. These test tones may be within the human hearing range or above or below the human hearing range.

Figure 4:
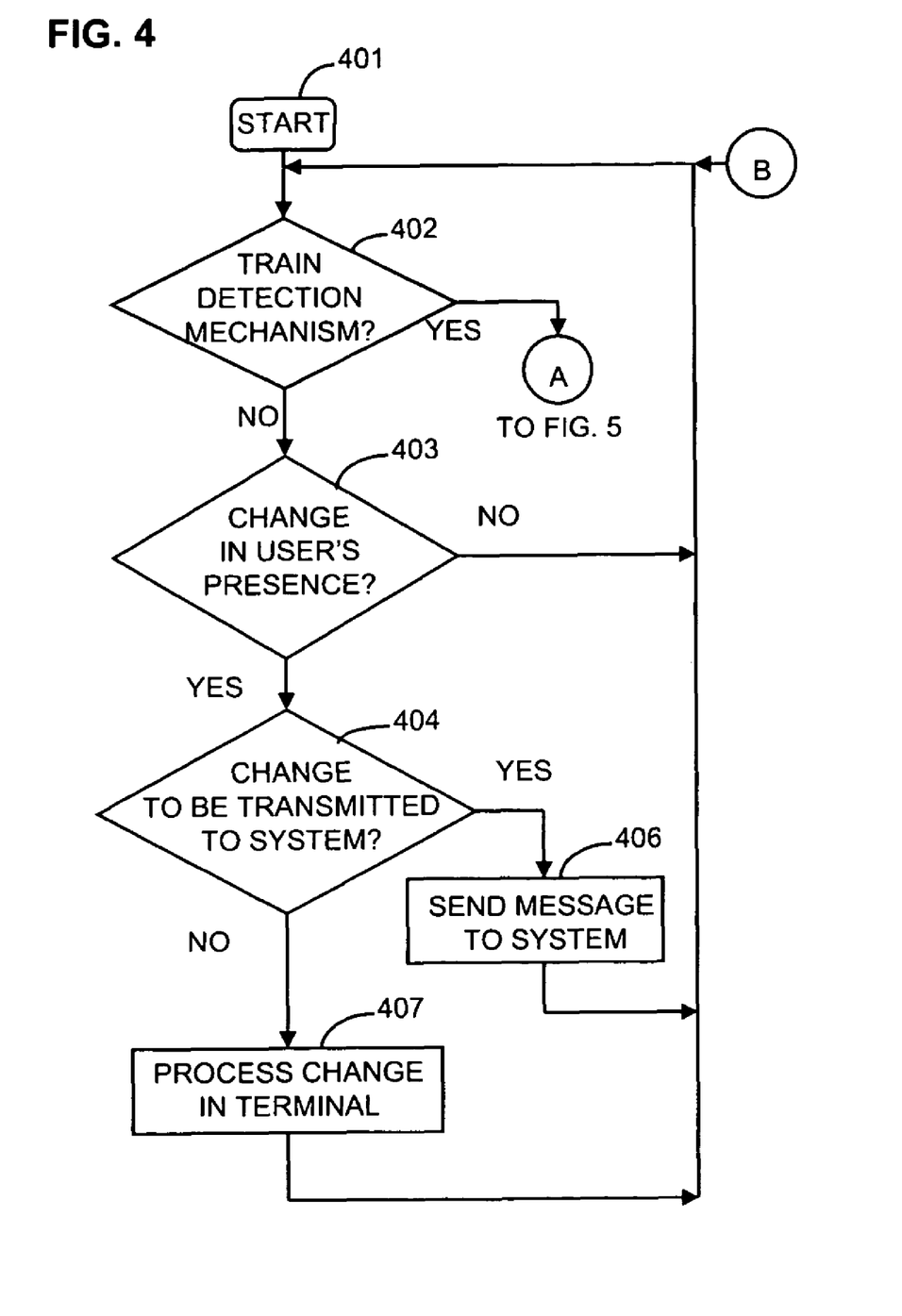
FIGS. 4-5 illustrate, in flowchart form, operations performed by embodiments.
Figure 5:
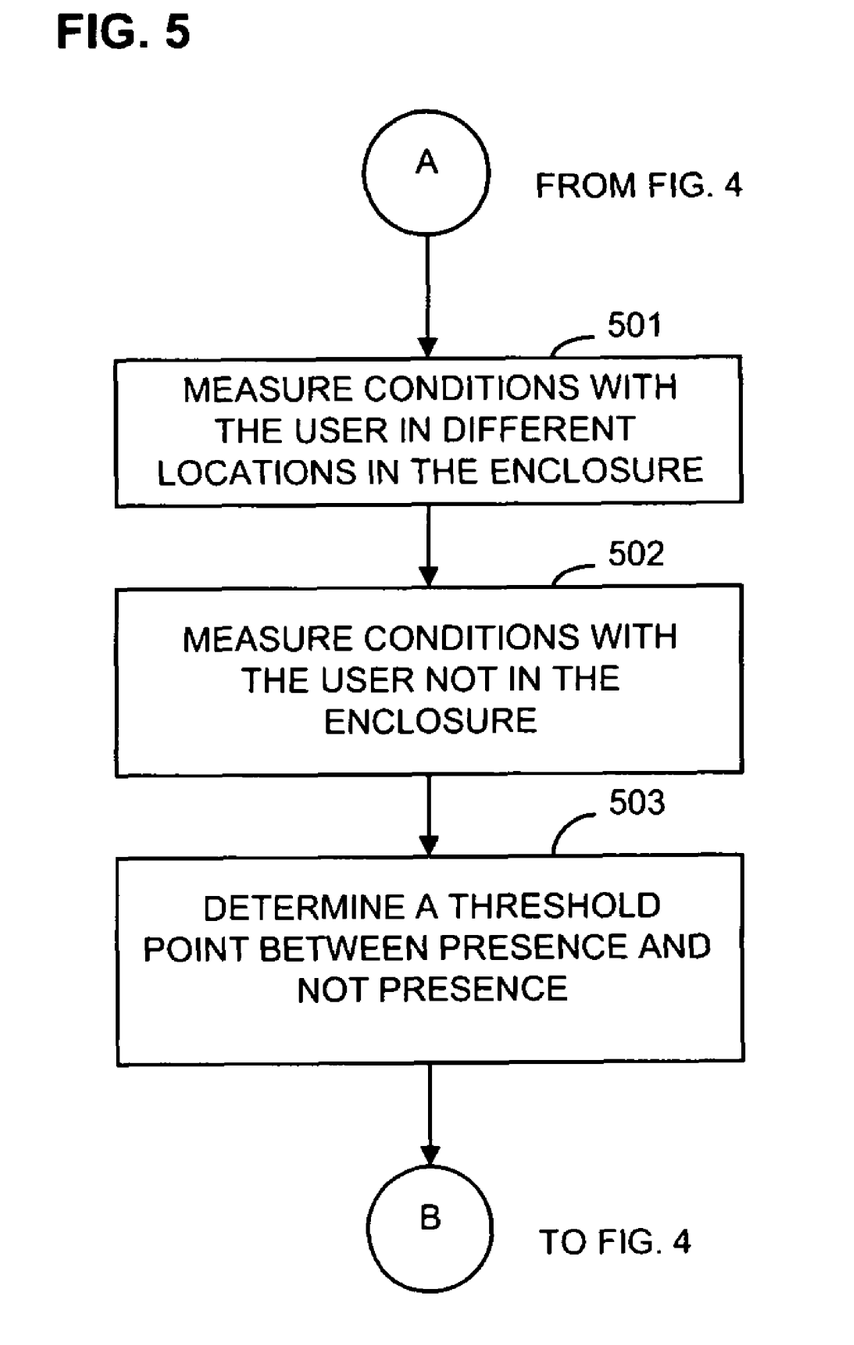

FIGS. 4 and 5 illustrate, in flowchart form, operations performed by one embodiment of a telecommunication terminal. After being started from block 401, decision block 402 determines whether the user wants to train the detection method which determines the presence or non-presence of the user at the telecommunication terminal. If the answer in decision block 402 is yes, control is transferred to block 501 of FIG. 5. If the answer in decision block 402 is no, control is transferred to decision block 403 which determines if there has been a change in the user's presence as detected by the detection method. If the answer is no in decision block 403, control is transferred back to decision block 402. If the answer is yes in decision block 403, control is transferred to decision block 404 which determines if the change in presence is to be transmitted to the system, which in this case means telecommunication switching system to which the telecommunication terminal is connected, or if the change will be processed solely by the telecommunication terminal. The change in presence will determine certain operations that will be taken for incoming and other telecommunication operations. The question being determine in decision block 404 is whether the switching system will handle these types of operations or the telecommunication terminal itself will. If the answer in decision block 404 is no, block 407 processes the change for future operations within the telecommunication terminal before transferring control back to decision block 402.

Block 501 of FIG. 5 first measures the condition with the user in different locations in the enclosure in which the telecommunication terminal is located. The enclosure may be an office, a cubicle, or other enclosures well known and utilized within the working environment. After the conditions such as the change to the acoustic path model 224 of FIG. 2 have been determined in block 501, the user then leaves the enclosure, and the changes made to the acoustic path model 224 of FIG. 2 are once again recorded. Finally, block 503 determines a threshold point between the presence and non-presence conditions before returning control back to FIG. 4.

Figure 6:
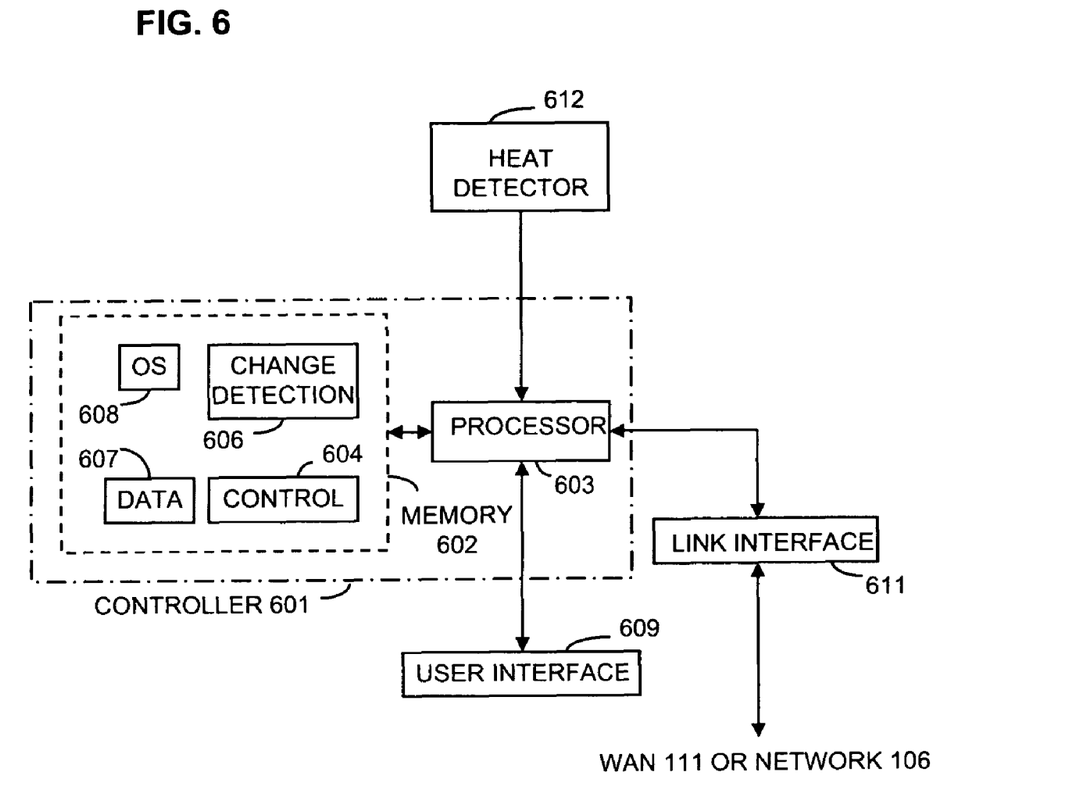
FIG. 6 illustrates, in block diagram form, another embodiment.

FIG. 6 illustrates, in block diagram form, a telecommunication terminal that utilizes a heat detector to determine the presence of the user based on the body heat given off by the user. Elements 601 through 611 perform similarly to elements 301, 314-322 and 331 of FIG. 3. With the exception, that processor 603 also performs functions for determining the output of heat detector 612. The operation of heat detector 612 and those performed by processor 603 with respect to heat detector 612 are disclosed in greater detail in U.S. Pat. No. 5,627,375 which is hereby incorporated by reference. Heat detector 612 corresponds to pyroelectric sensing circuit 220 and the operations of processor 603 correspond to operations of microprocessor 110 of incorporated U.S. Pat. No. 5,627,375. U.S. Pat. No. 5,315,434, which is also hereby incorporated by reference, also shows the operation of detecting the presence of a human by the heat given off by the human body.

Figure 7:
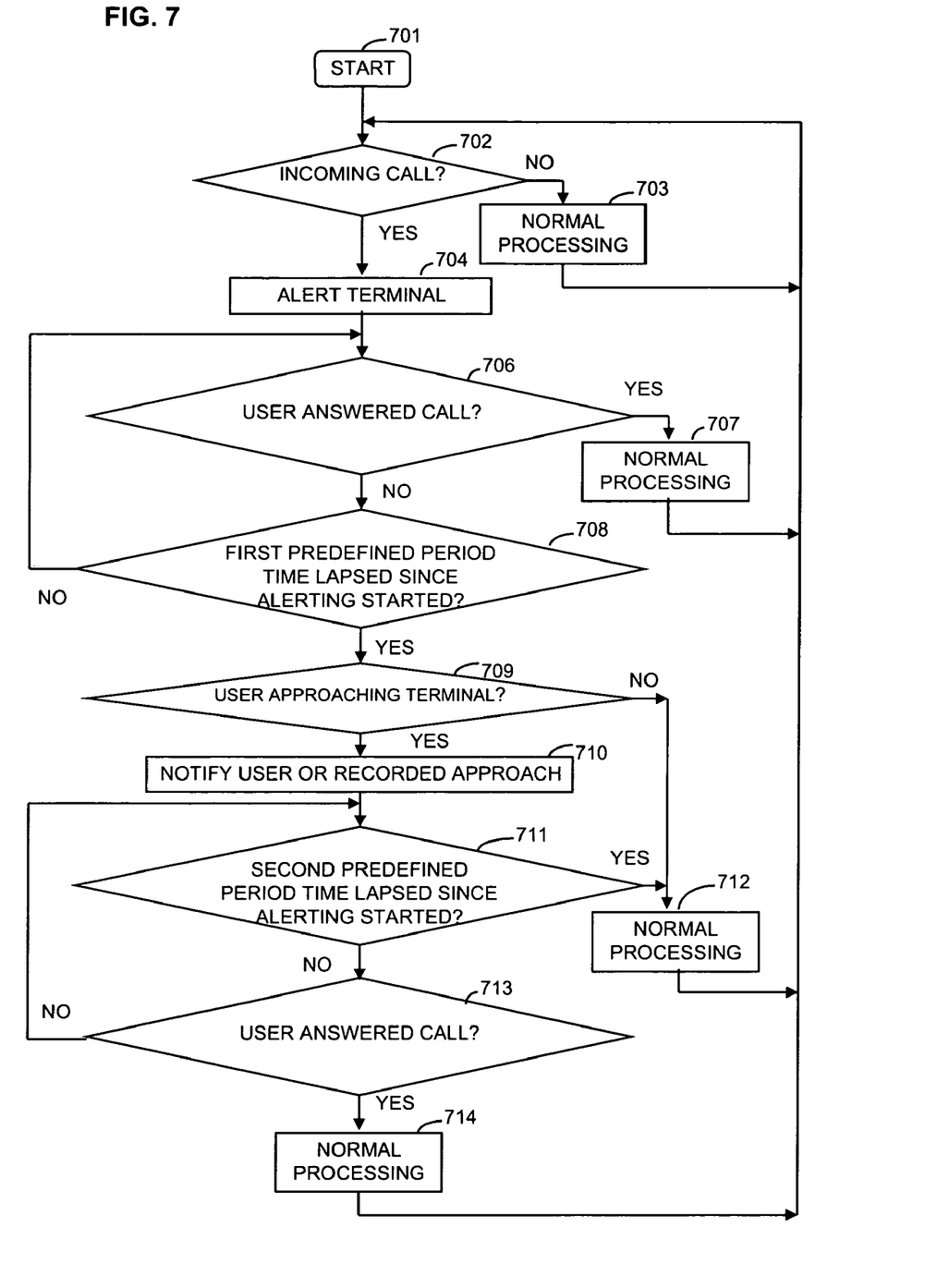
FIG. 7 illustrates, flowchart form, operations performed by embodiments.

FIG. 7 illustrates, in flowchart form, operations for one embodiment. After being started in block 701, decision block 702 determines if there is an incoming call. If the answer is no in decision block 702, block 703 performs normal processing before returning control back to decision block 702. If the answer in decision block 702 is yes, block 704 commences to alert the telecommunication terminal.

Next, decision block 706 determines if the user has answered the incoming call. If the answer is yes, block 707 performs normal processing which could consist of completing the call and setting up a communication channel between the caller and the callee. If the answer in decision block 706 is no, decision block 708 determines if a first predefined period of time has elapsed since alerting was started in block 704. If the answer is no, control is transferred back to decision block 706.

If the answer in decision block 708 is yes, decision block 709 determines if the user is approaching the telecommunication terminal. If the answer is no, control is transferred to block 712 which performs normal processing which could consist of either indicating a call abandonment to the caller or transferring the caller to a voice messaging system or answering machine.

If the answer in decision block 709 is yes, control is transferred to block 710. In one embodiment, block 710 may notify the user that the user's approach has been detected. This notification may be done by changing the alerting signal, flashing an indicator light, flashing or changing the color of a display screen or any other signaling mechanism known to one skilled in the art. In another embodiment, block 710 may cause the fact that the user's approach was detected during alerting to be stored. This fact may be stored in the telecommunication terminal or the telecommunication switching system for later use. In addition, operations of both embodiments may be employed together. At the completion of block 710, control is transferred to decision block 711.

Decision block 711 determines if a second predefined period of time has elapsed since alerting was started. The second predefined period of time would be longer than the first predefined period. If the answer is yes in decision block 711, control is transferred to block 712.

If the answer is no in decision block 711, block 713 determines if the user has answered the call. If the answer is yes, block 714 performs functions similar to those performed by block 707 before transferring control back to decision block 702. If the answer in decision block 713 is no, control is transferred back to decision block 711.

FIG. 7 has described the operations with respect to a telecommunication terminal or a telecommunication system receiving information concerning whether the user is approaching the terminal from the telecommunication terminal. However, the operations illustrated in FIG. 7 apply also to an answering machine connected to the telephone line servicing the called telephone. The only exceptions are that block 704 would not exist, decision block 708 and 711 would detect the start of the call setup, and decision blocks 706 and 711 would detect whether or not the user had answered the call in an answering machine by the ringing signal no longer appearing on the telephone line.

When the operations of the stations, servers, or telecommunication switching systems are implemented in software, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. The software can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. For example, the computer-readable medium can be, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured via optical scanning of the paper or other medium and then compiled, interpreted or otherwise processed in a suitable manner, if necessary, and stored in a computer memory.

In an alternative embodiment, where the stations, servers, or systems is implemented in hardware, the stations, servers, or systems can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modifications to the illustrated embodiments described above would be apparent to those skilled in the art. Such changes and modifications can be made without departing from the spirit and scope of the invention and without diminishing its intended advantages. It is therefore intended that such changes and modifications be covered by the following claims except in so far as limited by the prior art.

What is claimed is:

1. A method for processing telecommunication calls, comprising:
   receiving an incoming call for a telecommunication terminal;
   alerting an user of the telecommunication terminal for a first alerting period in response to the received incoming call;
   detecting an approach of the user after lapse of the first alerting period;
   notifying the user that the approach has been detected after lapse of the first alerting period by at least one of modifying an alerting signal used for the alerting, flashing an indicator light, flashing a display screen, or changing a display color of a display screen; and
   extending the first alerting time period by a second alerting time period upon detection of the approach of the user after the lapse of the first alerting period whereby the user is given additional time to respond to the incoming call.

2. The method of claim 1 further comprises storing a fact that the approach has been detected.

3. The method of claim 2 wherein the fact is stored in at least one of the telecommunication terminal or a telecommunication switching system.

4. The method of claim 1 wherein the detecting comprises testing acoustic paths communicating audio information from and back to the telecommunication terminal; and determining the approach of the user based on changes in the acoustic paths.

5. The method of claim 4 wherein the testing comprises forming a model of the acoustic paths;
detecting modifications in the acoustic paths to update the model of the acoustic paths; and
the step of determining comprises the step of using the detected modifications to determine changes in the acoustic paths.

6. The method of claim 4 wherein the audio information is at least one of within human hearing, above human hearing or below human hearing.

7. The method of claim 1 wherein the detecting comprises using radiation.

8. The method of claim 7 wherein the radiation is at least one of high frequency electromagnetic radiation or infrared radiation.

9. The method of claim 1 wherein the detecting comprises using visual operations.

10. A processor-readable medium for processing telecommunication calls, comprising processor-executable instructions configured for:
receiving an incoming call for a telecommunication terminal;
alerting an user of the telecommunication terminal for a first alerting period in response to the received incoming call;
detecting an approach of the user after lapse of the first alerting period;
notifying the user that the approach has been detected after lapse of the first alerting period by at least one of modifying an alerting signal used for the alerting, flashing an, indicator light, flashing a display screen, or changing a display color of a display screen; and
extending the first alerting time period by a second alerting time period upon detection of the approach of the user after the lapse of the first alerting period whereby the user is given additional time to respond to the incoming call.

11. The processor-readable medium of claim 10 wherein the processor-executable instructions for detecting comprise processor-executable instructions for testing acoustic paths communicating audio information from and back to the telecommunication terminal; and
processor-executable instructions for determining the approach of the user based on changes in the acoustic paths.

12. The processor-readable medium of claim 11 wherein the audio information is at least one of within human hearing, above human hearing or below human hearing.

13. The processor-readable medium of claim 10 wherein the processor-executable instructions for detecting comprises using radiation.

14. The processor-readable medium of claim 10 wherein the processor-executable instructions for detecting comprises using visual operations.

* * * * *